(12) United States Patent
Pedigo et al.

(10) Patent No.: US 10,065,481 B2
(45) Date of Patent: Sep. 4, 2018

(54) NON-WOVEN AIR EXHAUSTER AND FILTER

(75) Inventors: Donald B. Pedigo, Clarksville, TN (US); Daniel Woodman, Clarksville, TN (US)

(73) Assignee: FREUDENBERG FILTRATION TECHNOLOGIES, L.P., Hopkinsville, KY (US)

( * ) Notice: Subject to any disclaimer, the term of this patent is extended or adjusted under 35 U.S.C. 154(b) by 1317 days.

(21) Appl. No.: 12/541,577

(22) Filed: Aug. 14, 2009

(65) Prior Publication Data

US 2011/0039489 A1 Feb. 17, 2011

(51) Int. Cl.
*B60H 1/24* (2006.01)
*B60H 3/06* (2006.01)

(52) U.S. Cl.
CPC ........... *B60H 1/249* (2013.01); *B60H 3/0641* (2013.01)

(58) Field of Classification Search
CPC .......... B60H 1/24; B01D 29/03; B01D 46/00
USPC .......... 454/162, 164; 55/490, 497, 522, 318, 55/500, 511, 521, 385.3, 486, 96; 96/134, 153; 210/493.1, 493.5
See application file for complete search history.

(56) References Cited

U.S. PATENT DOCUMENTS

| | | | |
|---|---|---|---|
| 3,732,801 A | 5/1973 | Wallis | |
| 4,319,519 A | 3/1982 | Parsson | |
| 4,432,514 A | 2/1984 | Brandon | |
| 4,660,462 A | 4/1987 | Thompson et al. | |
| 4,667,578 A | 5/1987 | Hagenah | |
| 4,691,623 A | 9/1987 | Mizusawa | |
| 4,781,106 A | 11/1988 | Frien | |
| 4,917,942 A * | 4/1990 | Winters | 96/99 |
| 5,085,132 A | 2/1992 | Ikeda et al. | |
| 5,105,849 A | 4/1992 | Clough | |
| 5,169,356 A | 12/1992 | Arold | |
| 5,194,038 A | 3/1993 | Klomhaus et al. | |
| 5,263,895 A | 11/1993 | Kraus et al. | |
| 5,391,112 A | 2/1995 | Wardlaw | |
| 5,419,739 A | 5/1995 | Lewis | |
| 5,492,505 A | 2/1996 | Bell et al. | |
| 5,503,178 A | 4/1996 | Miskelley et al. | |
| 5,601,117 A | 2/1997 | Lewis et al. | |
| 5,762,665 A | 6/1998 | Abrahamian et al. | |
| 5,772,713 A | 6/1998 | Salinas et al. | |
| 5,817,584 A * | 10/1998 | Singer et al. | 442/345 |
| 5,833,528 A * | 11/1998 | Baum et al. | 454/151 |
| 5,904,618 A | 5/1999 | Lewis | |
| 5,941,244 A * | 8/1999 | Yamazaki et al. | 128/206.19 |
| 6,026,852 A | 2/2000 | Barton et al. | |

(Continued)

*Primary Examiner* — Steven B McAllister
*Assistant Examiner* — Samantha Miller
(74) *Attorney, Agent, or Firm* — Grossman, Tucker, Perrault & Pfleger, PLLC (57) ABSTRACT

An improved air exhauster for a vehicle is provided, comprising a non-woven filter with a covering sheet of material fastened to the filter face. The filter may be assembled into a frame and the covering sheet may acts as valve to allow air outflow from the interior of the vehicle, yet restrict outside noise from entering. The covering sheet may be a relatively more dense non-woven material than the filter or may be a polymer film. The covering sheet may be attached at the centerline of the filter to function as a pleat separator and reduce the incidence of pleat collapse under high flow rate or increased pressure drop.

22 Claims, 5 Drawing Sheets

(56) References Cited

U.S. PATENT DOCUMENTS

| | | | |
|---|---|---|---|
| 6,062,975 A | 5/2000 | Knudtson | |
| 6,135,543 A | 10/2000 | Esposito et al. | |
| 6,309,438 B1 * | 10/2001 | Kanno et al. | 55/486 |
| 6,454,834 B1 * | 9/2002 | Livingstone | B01D 53/04 55/385.3 |
| RE37,974 E | 2/2003 | Bowers | |
| 6,602,330 B2 | 8/2003 | Allen | |
| 6,645,388 B2 * | 11/2003 | Sheikh-Ali | 210/767 |
| 6,692,347 B1 * | 2/2004 | Schneider | 454/158 |
| 6,758,739 B1 | 7/2004 | Sangwan et al. | |
| 6,814,660 B1 * | 11/2004 | Cavett | 454/284 |
| 6,969,314 B2 | 11/2005 | Misner | |
| 7,077,742 B2 | 7/2006 | Stevenson et al. | |
| 7,132,009 B2 | 11/2006 | Chiang | |
| 7,137,880 B2 * | 11/2006 | Omiya et al. | 454/162 |
| 7,517,280 B2 | 4/2009 | McConnell et al. | |
| 7,857,892 B2 * | 12/2010 | Marra | B60H 1/008 95/3 |
| 8,096,482 B2 * | 1/2012 | Dage | 236/51 |
| 8,109,108 B2 * | 2/2012 | Nagayama et al. | 62/244 |
| 8,430,450 B2 * | 4/2013 | Stephens et al. | 296/190.09 |
| 2001/0042724 A1 * | 11/2001 | Sheikh-Ali | 210/767 |
| 2003/0070406 A1 * | 4/2003 | Duffy | B01D 29/031 55/497 |
| 2003/0145568 A1 * | 8/2003 | Hodge | B01D 46/0036 55/418 |
| 2003/0157881 A1 * | 8/2003 | Goupil et al. | 454/158 |
| 2004/0112023 A1 * | 6/2004 | Choi | B01D 29/012 55/486 |
| 2004/0192186 A1 * | 9/2004 | Bourgeois et al. | 454/187 |
| 2004/0253566 A1 | 12/2004 | Quinn et al. | |
| 2005/0028498 A1 * | 2/2005 | Entezarian | B01D 50/002 55/320 |
| 2005/0075064 A1 * | 4/2005 | Omiya et al. | 454/162 |
| 2005/0098215 A1 | 5/2005 | Call et al. | |
| 2005/0227607 A1 | 10/2005 | Stevenson et al. | |
| 2005/0239392 A1 * | 10/2005 | Sells | 454/165 |
| 2005/0284116 A1 * | 12/2005 | Duffy | B01D 46/0001 55/497 |
| 2006/0196652 A1 * | 9/2006 | Nagayama et al. | 165/202 |
| 2006/0199528 A1 | 9/2006 | Rivera et al. | |
| 2007/0066208 A1 | 3/2007 | Almori et al. | |
| 2007/0261376 A1 | 11/2007 | Elliot et al. | |
| 2007/0275651 A1 * | 11/2007 | Palmer | 454/238 |
| 2008/0160903 A1 * | 7/2008 | Fontana | 454/289 |
| 2008/0196878 A1 * | 8/2008 | Errington et al. | 165/203 |
| 2008/0229721 A1 | 9/2008 | Richter et al. | |
| 2009/0088062 A1 | 4/2009 | Major et al. | |
| 2009/0191805 A1 * | 7/2009 | Cusumano | H01M 8/04 454/158 |
| 2011/0039489 A1 * | 2/2011 | Pedigo et al. | 454/162 |
| 2012/0082711 A1 * | 4/2012 | Goranov | 424/404 |
| 2012/0160247 A1 * | 6/2012 | Quincy et al. | 128/206.19 |

\* cited by examiner

NON-WOVEN AIR EXHAUSTER AND FILTER

FIELD

The present disclosure relates to air exhausters for vehicles, and more particularly, to air exhausters including a non-woven filter media.

BACKGROUND

Pressure relief valves for the cabin of a motor vehicle are well known. Sedans and sport utility vehicles may include a plurality of pressure relief valves to allow the exhausting of air from the cabin or to relieve pressure during a sudden increase of pressure in the cabin. Furthermore, the valves may allow a free flow of air for ventilation systems to provide efficient cooling and heating of the passenger compartment.

Generally, the valves may include a plurality of relatively flexible flaps or louvers that may rest on a gate system or other such structure. The gate system allows the relatively flexible flaps to act as a one-way check or reed valve, so that the flow of air may be quickly exhausted without encountering a significant obstruction, while allowing the flaps to recover to an initial position when there is no flow, so as to restrict unwanted backflow of unfiltered air into the passenger compartment.

Air exhausters may provide a controlled air relief system to maintain the balance that the HVAC system requires. When the HVAC system is in fresh air mode and outside ambient air is being processed, an equivalent airflow mass may be removed from the vehicle by air exhausters. The body panels and seals typically do not provide enough controlled venting capacity to handle the HVAC airflow requirements. Exhausters may be installed in a rearward area of the body of the vehicle to furnish controlled airflow vent paths that may reduce interior cabin pressures and improve airflow distribution from the front of vehicle to the rear of vehicle. Exhausters also provide airflow relief paths which help facilitate door closing by reducing efforts as well as assisting in airbag deployment.

The use of air exhausters may aid in reducing the noise level in the vehicle by reducing aspiration noise. Preferably, at least two body exhausters may be located at the rearmost corners of the vehicle which may be fed via a somewhat torturous airflow path to provide an effective airflow path while minimizing noise.

Air exhausters of the flap type may not seal tightly enough to prevent some inflow of exhaust gases, odors, other contaminants or outside noise. These devices typically are molded of injection molded rubber and plastic having a relatively high density, thus contributing weight to the vehicle.

What is needed is an air exhauster of light weight which can filter the inflow of contaminated air, reduce noise intrusion and not substantially restrict the outflow of air from the vehicle cabin.

SUMMARY

In a first aspect, the present disclosure is directed at an air exhauster for relieving pressure from a vehicle interior comprising a non-woven filter element having a downstream side and an upstream side with respect to air flow. A covering sheet may then be attached to at least a portion of the non-woven filter element on the downstream side wherein the covering sheet in a first position contacts at least a portion of the non-woven filter element to at least partially restrict the element from the inflow of air from the vehicle exterior to said upstream side of said filter. In a second position at least a portion of the covering sheet is displaced from contact with the filter element to allow an outflow of air from the vehicle interior and said downstream side of said filter.

In a related embodiment the present disclosure is again directed at an air exhauster for relieving pressure from a vehicle interior comprising a non-woven filter element including banding along an edge thereof having a centerline including one or more pleats having a downstream side and an upstream side with respect to air flow. A non-woven covering sheet is then provided having a centerline attached to the centerline of the non-woven filter element on the downstream side, wherein the covering sheet in a first position contacts at least a portion of the non-woven filter element to at least partially restrict the element from the inflow of air from the vehicle exterior to said upstream side of the filter. In a second position at least a portion of the covering sheet is displaced from contact with the filter element to allow an outflow of air from the vehicle interior and the downstream side of the filter.

In a still further related embodiment the present disclosure is directed to a method of relieving pressure build-up from the interior of a vehicle, comprising providing a non-woven filter element having a downstream side and an upstream side with respect to air flow and providing a covering sheet attached to at least a portion of he non-woven filter element on the downstream side. This may then be followed by positioning the cover sheet at a first position to contact at least a portion of the non-woven filter element to at least partially restrict the element from the inflow of air from the vehicle exterior to the upstream side of the filter. This may then be followed by positioning the covering sheet at a second position wherein at least a portion of the covering sheet is displaced from contact with the filter element to allow an outflow of air from the vehicle interior and the downstream side of the filter.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Air exhausters are typically installed in the rear portions of a vehicle to relieve pressure and exhaust stale air from the interior. As presently configured, they may comprise low resistance flap valves that provide minimal resistance to the outflow of air but do little to filter contaminants or odors from any backflow or to reduce the possibility of outside noise entering the vehicle.

Figure 1:
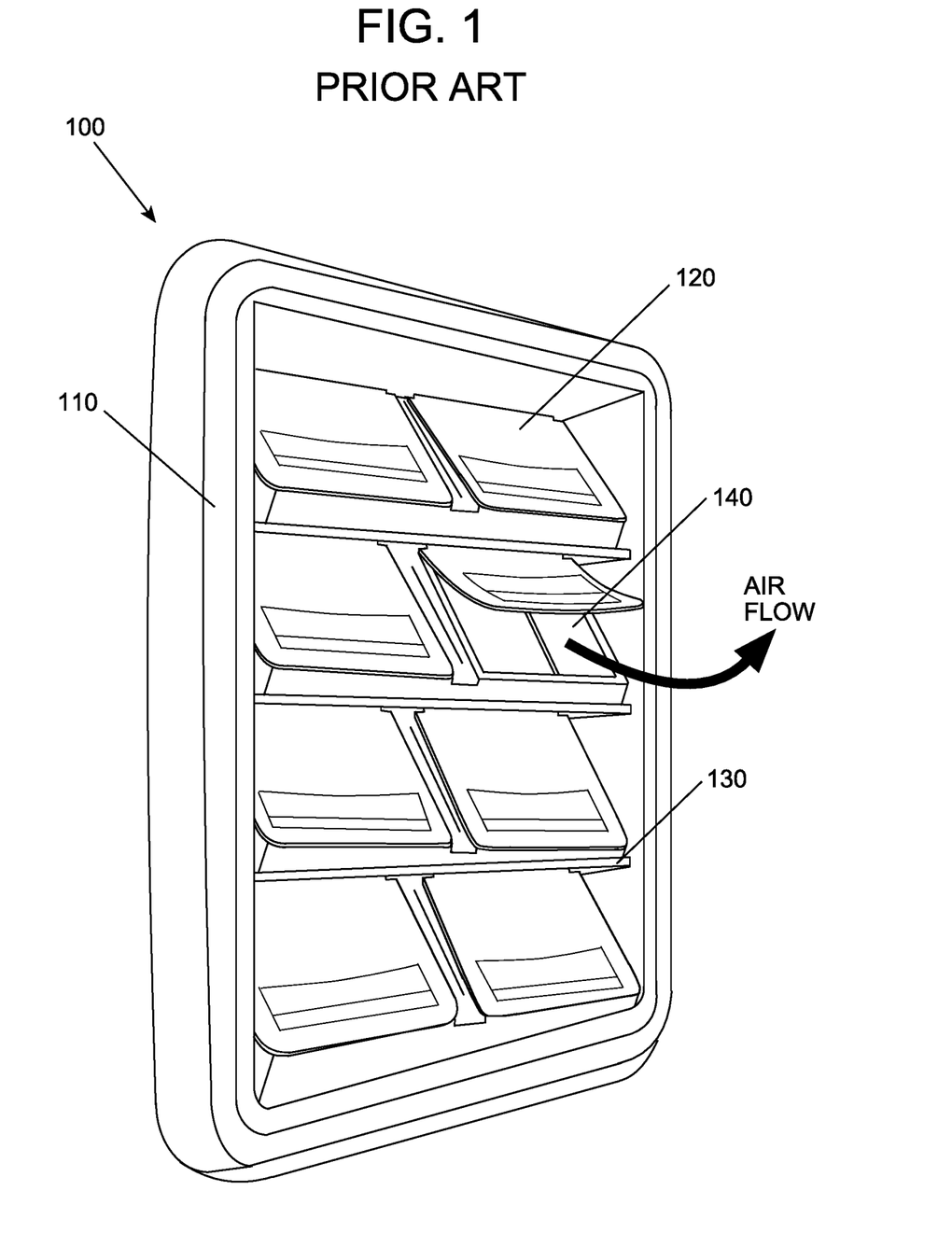
FIG. 1 is a perspective view of a prior art pressure relief valve/air exhauster for a vehicle.

FIG. 1 is a perspective view of a prior art air exhauster 100 for a motor vehicle comprising a skeletal gate system 130 installed in or molded into a frame 110. The frame and gate system may be molded of relatively rigid plastic. A number of flexible flaps 120 act as one-way valves to cover or uncover openings 140 in the gate system to allow pressure in the interior of the vehicle to be readily relieved. Flap 122 is shown in a deflected position as an illustration of how the flaps respond to airflow from the vehicle. The flaps may comprise rubber or thermoplastic elastomers.

Figure 2:
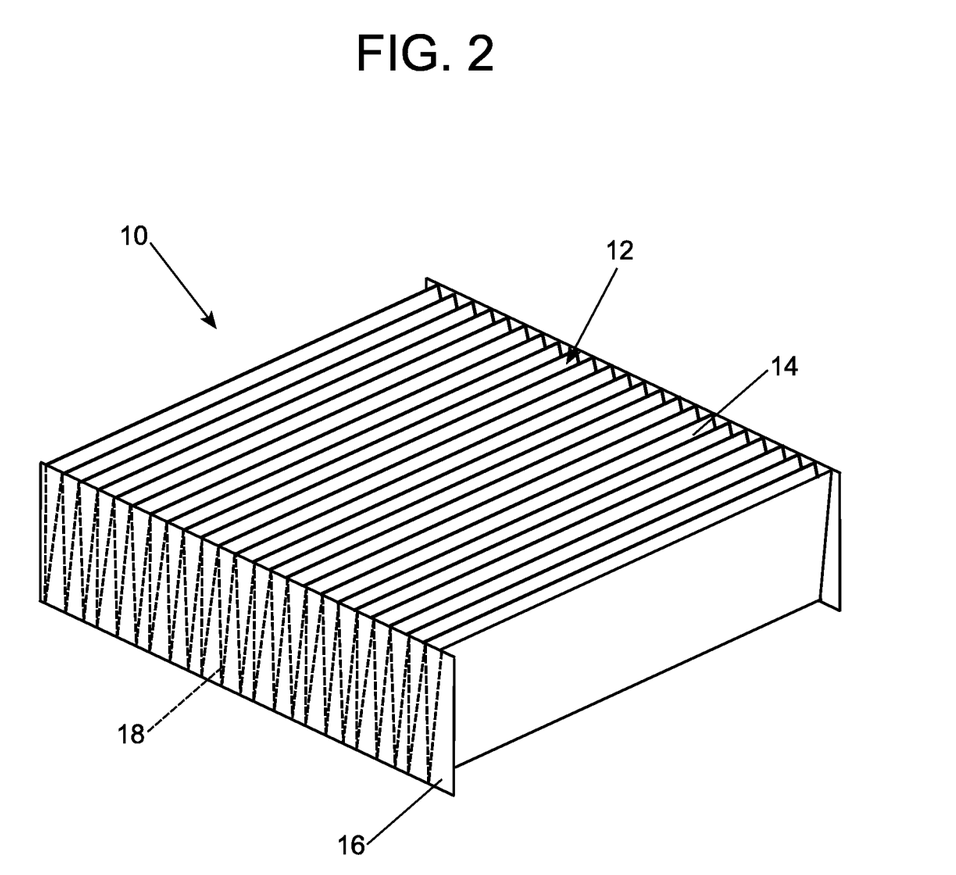
FIG. 2 is a perspective view of a pleated filter element including edge bands.

FIG. 2 is a perspective view of a non-woven fabric 12 that may be preferably formed into a pleated element 10 for use in an improved air exhauster which may now reduce noise and contaminants from entering the interior of a vehicle, according to the present disclosure. Reference herein to a pleated element may be understood as any geometric modification of the non-woven (e.g. folding) that may be relied upon to increase the effective surface area of impinging air that is configured to flow through the non-woven. In addition, the interior of the vehicle may be understood herein as any enclosed area within the vehicle other than the engine compartment, such as the passenger seating location, trunk location (if present). The interior of the vehicle may therefore rely upon the air exhauster herein for relieving pressure when, as alluded to above, there is a relatively sudden increase of pressure (e.g. upon closing of a vehicle door or trunk and/or when there is a need for controlled air relief to maintain a pressure balance).

The element 10 may preferably include one or a plurality of pleats 14 which may optionally contain edge banding 16 along one or more sides to space the pleats and thereby insure a greater exposed surface area for filtration. Preferably, two sides of the element may include edge banding, however, edge banding may be present on only one side. Each element 10 may comprise a sheet of non-woven fabric 12 that has been pleated or folded in an accordion (zig-zag) fashion (see dashed lines indicated by reference numeral 18). The edge banding may be adhered to the pleated element by an adhesive, such as a hot melt adhesive and/or other attachment methods, such as by mechanical attachment. The element 10 may measure, for instance in one particularly preferred application, about 140 mm in length by 110 mm in width and by 24 mm in thickness along with 18.5 mm pleats (i.e. pleats which provide a surface from the downstream to upstream location of 18.5 mm). Such pleats, if present, are preferably spaced about 6 mm apart from one another.

Any polymer which can be formed into a fabric, such as polyester or polyolefin, and/or even natural fibers (cellulosic) or combinations thereof, may be used to form the non-woven fabric. Use of polyester may preferably provide a desired level of moisture resistance. Use of polypropylene may also provide additional water barrier function as polypropylene is generally hydrophobic (e.g. an equilibrium water absorption of less than or equal to 1.0% by weight). Reference to a non-woven herein may be understood as a fabric that is produced from a web of fiber, without the yarn preparation necessary for weaving and knitting. In the nonwoven, the assembly of fibers may be held together by mechanical interlocking in a random web or mat or by fusing of the fibers as in the case of thermoplastic fibers or by bonding with a cementing medium such as starch, casein, rubber latex, a cellulose derivative or synthetic resin. If more than one type of fiber is used, the fibers may be randomly distributed or arranged in layers to provide specific functional properties (filtering efficiency, adsorption, noise attenuation, etc.). In addition, activated carbon filtration media may be included in the fabric to absorb gasoline fumes or other odors/vapors.

The non-woven fabric may preferably have a basis weight between about 50 g/m² and about 200 g/m², preferably between about 70 g/m² for a low efficiency filter to about 165 g/m² for a higher efficiency filter, which may then demonstrate relatively better noise attenuation. The edge banding itself may have a basis weight of about 250-400 g/m².

Figure 3:
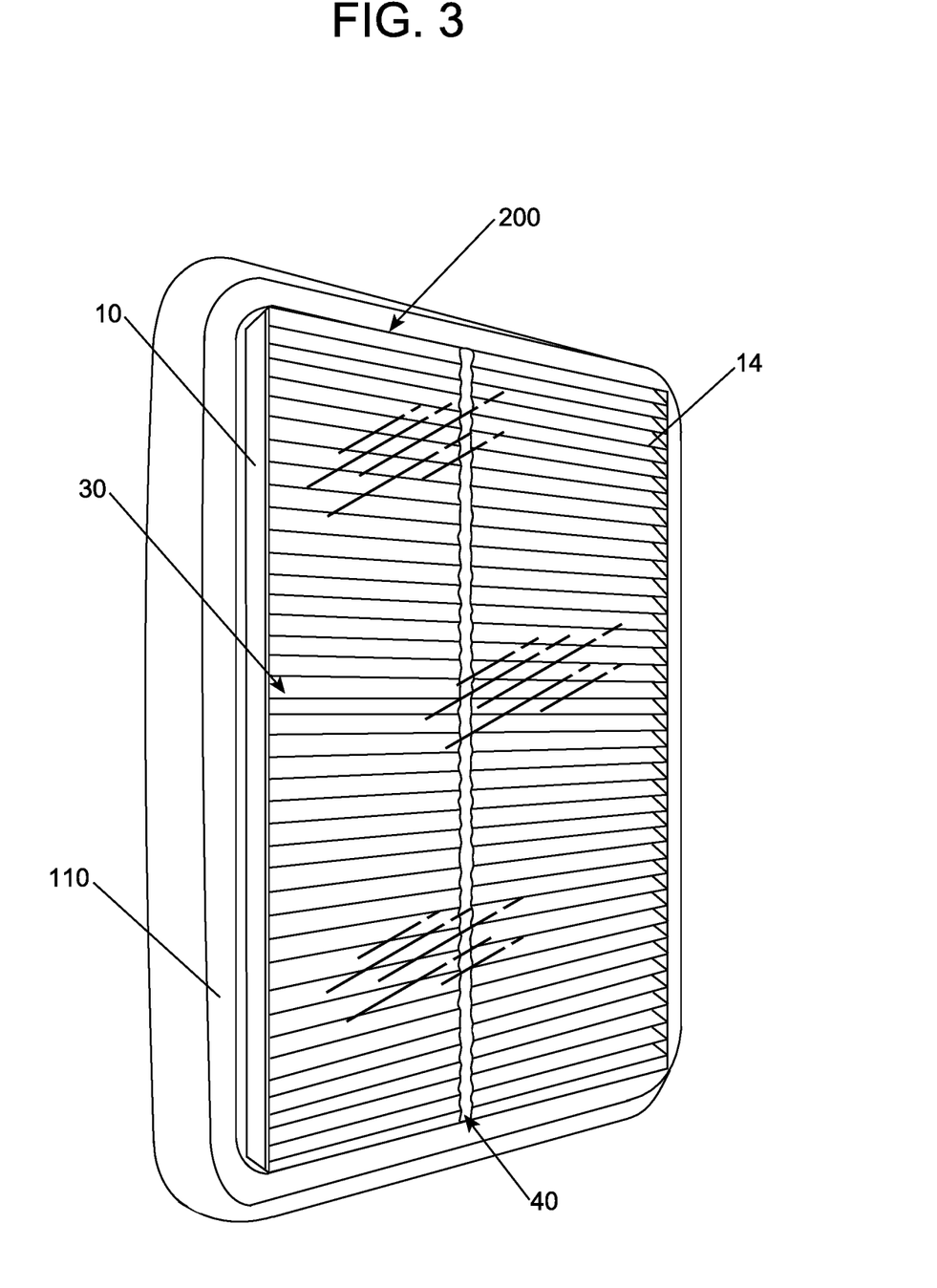
FIG. 3 is a perspective view of the filter element of FIG. 2 with a flap valve attached to the filter face and installed in a frame.

FIG. 3 is a perspective view of the filter element 10 of FIG. 2 with a covering sheet 30 attached to the downstream face of the filter element and installed in a frame 110. Here, a polymeric film is illustrated as the covering sheet 30 and is attached to the pleats 14, preferably adjacent the centerline of the element 10. That is, the centerline of the covering sheet 30 is attached to the centerline of the filter element 10. Reference to centerline of the element 10 or covering sheet 30 may be understood as that point substantially equidistant from the two lengthwise edges of the element 10 or sheet 30, as illustrated. In such manner, the single point of attachment directly to the non-woven at or near the centerline will provide two flaps for the flow of air, where each flap will require a substantially similar force to lift and allow air flow. Alternatively, the point of attachment may closer to one lengthwise edge than the opposing lengthwise edge, thereby leading to the situation where the two flaps will require a dissimilar force to lift and again provide air flow. In this manner, one may selectively provide airflow through different portions of the underlying filter element 10.

An adhesive 40, such as a hot melt, may be used to attach the covering sheet to the element or other means, such as sewing or stitching, thermal or energy bonding or hook and loop fasteners may be used. Such adhesive, if attached to the individual pleats may also function as a pleat spacer or stabilizer to prevent pleat collapse due to relatively high exhaust flow rates. As used herein, "thermal bonding" refers to the melting, for instance by heat or light, of one or both of the covering sheet and non-woven fabric to achieve attachment. As used herein, "energy bonding" refers to the use of vibration energy for instance, ultrasonic or friction, to achieve attachment.

In FIG. 3, the covering sheet 30 is illustrated as a relatively clear polymer film, such as a transparent polyester, e.g. Mylar®, having a selected stiffness suitable for allowing exhaust air to cause the edges of the sheet 30 to move away from the surface of the pleats 14 under, for instance, an airflow of >170 scfm at 0.4 inches of water. The thickness of the film may be in the range of about 3-8 mils (about 0.08-0.20 mm.). It may therefore be appreciated that by selecting a polymer film with an associated flex modulus, one may actually regulate the level of resistance in biasing the film against the filter element. In addition, this biasing regulation may in fact be optimized in the sense that the film is, as illustrated, directly attached and in contact with the filter element 10 and there is essentially no space between the surface of the filter element pleats (as shown) and the polymer film covering sheet 30.

FIG. 3 further illustrates the air exhauster 200, the combination of pleated filter element 10 and covering sheet 30, installed in a relatively rigid plastic frame 110, as it may be installed in a vehicle under conditions where no air is being exhausted (accordingly, the covering sheet 30 is lying flush to the filter element 10). The exhauster 200 may be releasably attached to a separately molded frame 110 for ease of servicing, by providing, for instance, detents or spring-finger catches (not shown) on the inner periphery of the frame to provide a friction fit and retain the exhauster in place. Should servicing not be required the exhauster may be insert-molded into the frame as the frame is being molded. Adhesives or other types of fasteners may also be used for attachment.

Figure 4:
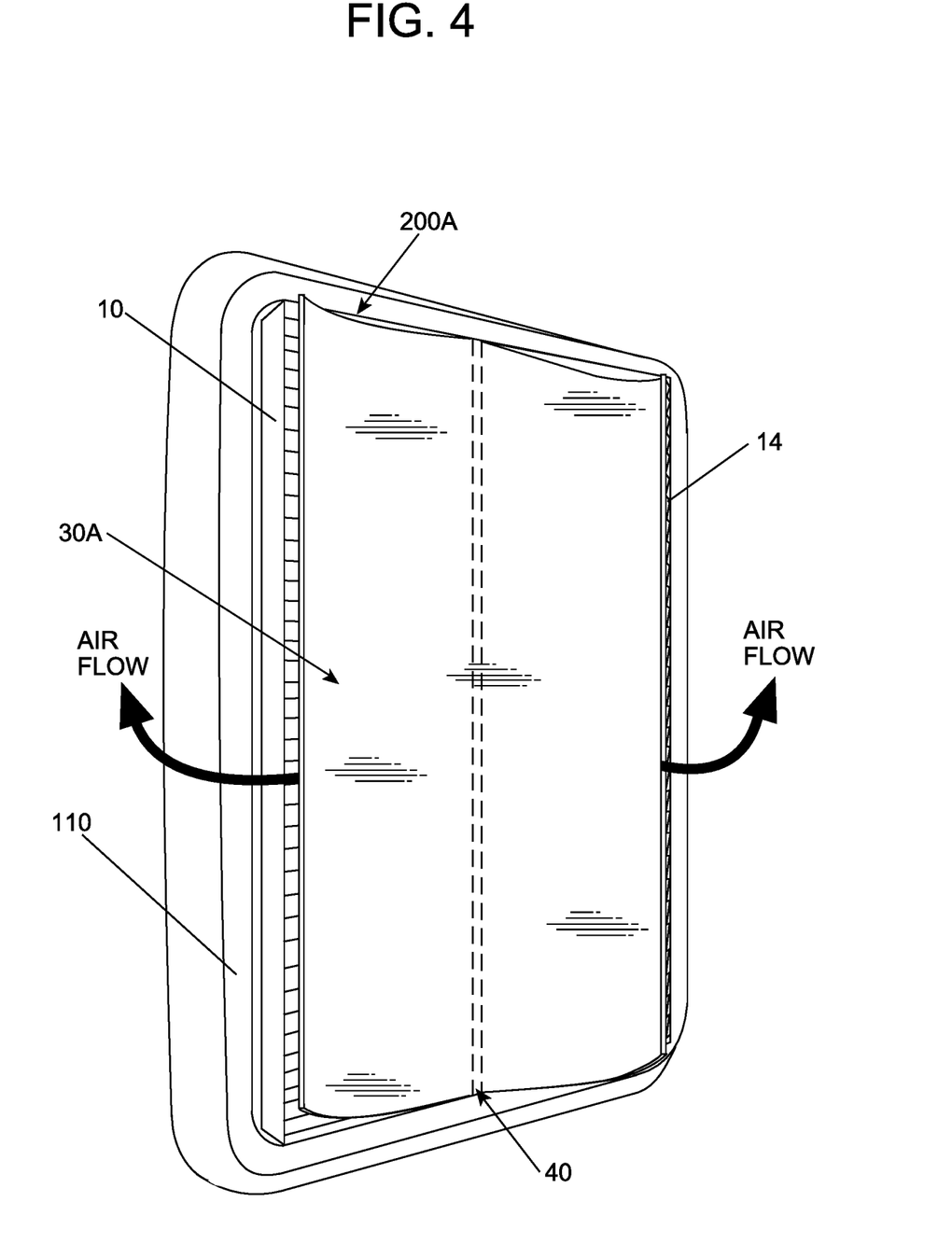
FIG. 4 is a perspective view of a second embodiment illustrating a non-woven flap valve and element installed in a frame and illustrating a position of the flap valve during outflow of air through the air exhauster.

FIG. 4 is a perspective view of another embodiment illustrating a non-woven covering sheet 30A and element 10 installed in a frame 110 and illustrating a position of the covering sheet during outflow of air through the air exhauster 200A. The covering sheet 30A may comprise a non-woven fabric, such as disclosed above for the filter element, having a stiffness suitable for allowing exhaust air to cause the edges of the sheet 30 to move away from the surface of the pleats 14 under, for instance, an airflow of >170 scfm. at 0.4 inches of water. This may include the covering sheet 30A comprising a non-woven fabric having a basis weight in the range of about 150 g/m² to about 350 g/m², preferably about 250 g/m². The covering sheet may also itself be relatively more dense than the filter element.

The covering sheet 30A is illustrated as if air was flowing through the exhauster 200A. That is, one or more edges of the sheet are shown lifting from the surface of the pleats 14. As alluded to above, the adhesive 40 may be positioned between the sheet 30A and the pleats 14 adjacent the centerline of the element 10, or penetrate into the non-woven fabric sheet as shown. While the drawings show the sheet attached to the pleats adjacent a centerline of the element, it is contemplated that the attachment could be made at any location across the surface of the element, including an edge, and may further divide the filter face into one or more flap valves having virtually any shape. For example, the covering sheet may be adhered along one or more of the top, bottom, or one of the two sides of the filter element 10. In other words, it is contemplated that the covering sheet may be adhered and in contact with the filter element at, e.g., the top and bottom of the filter element 10, which would also serve to regulate the amount of exhaust pressure that one may require to provide flow-through of air.

It is further contemplated that the covering sheet itself may have a geometry that itself leads to biasing to provide relatively tighter sealing at the edges. This may be achieved by molding the covering 30 (a polymer film or non-woven sheet) with a slight concave curvature towards the filter face, or by forming the sheet with a relatively greater thickness along the edges than at the covering sheet center. Further, it is contemplated that the covering sheet may be creased or folded along the attachment line, or along other locations, to perform as a living hinge to provide a further measure to regulate for resisting of the air flow.

Figure 5:
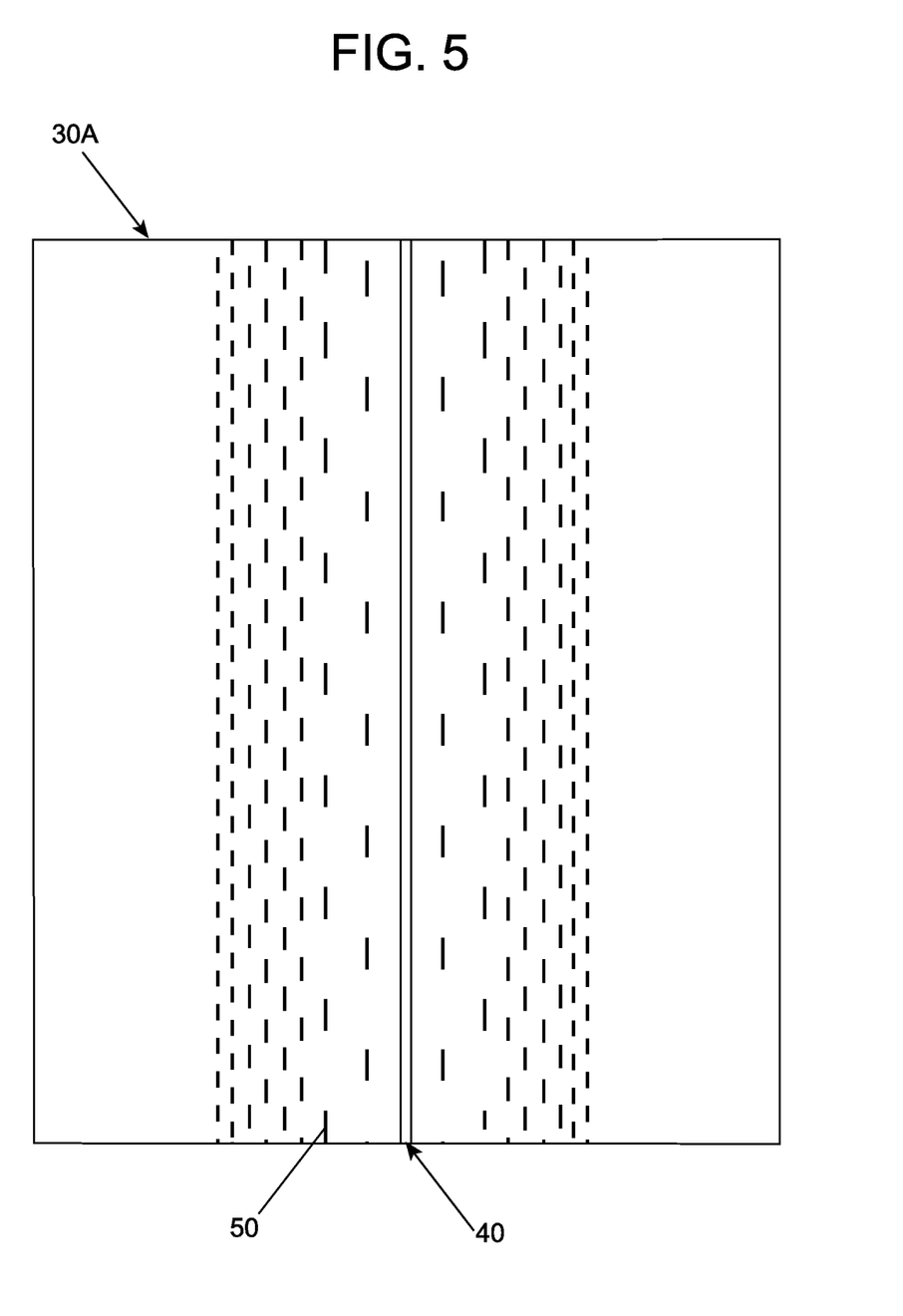
FIG. 5 illustrates means for adjusting the force to open the flap valve/covering sheet.

FIG. 5 illustrates yet another method for regulating air flow and the force to open the covering sheet 30A. More specifically, the non-woven sheet 30A may now include a series of perforations 50, optionally located adjacent the attachment line 40, where the perforations (openings) may vary in length (longest linear dimension), spacing (distance between the perforations or relative location to one another), and shape (e.g. round versus square versus small opening versus large opening). The perforations may also vary in their relative spacing between two or more rows. Accordingly, by varying one or more of the length, spacing and/or shape one may selectively force air preferentially through one or more locations in the filter element 10.

Preferably, the perforations may be about 5 mm in length and spaced apart by about 15 mm in rows that are 6 mm apart near the centerline of the sheet, and be uniformly reduced to about 5 mm. in length, spaced 5 mm apart in rows that are 2 mm apart along the outermost row. In addition, the perforations may be used with the adhesive to attach the covering sheet 30A to the pleats while allowing some adhesive to fill the perforations and improve the bond strength of the covering sheet to the filter element 10.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An air exhauster for relieving pressure from a vehicle interior comprising:
   a frame and a non-woven filter element contained in said frame, wherein the
   non-woven filter element includes pleats having a downstream side and an upstream side with respect to air flow;
   a covering sheet comprising a polymer film or a non-woven fabric attached directly to at least a portion of said non-woven pleats on said downstream side of said pleats, wherein said covering sheet in a first position directly contacts at least a portion of said downstream side of said non-woven pleats to at least partially restrict said element from the inflow of air from said vehicle exterior to said upstream side of said filter and in a second position said portion of said covering sheet is displaced from direct contact with said pleats due to an outflow of air from said vehicle interior and said downstream side of said filter; and
   wherein said covering sheet is directly attached to said downstream side of said pleats of said filter element by one or more of an adhesive, sewing, thermal or energy bonding, or hook and loop fasteners.

2. The air exhauster of claim 1 wherein said film comprises a polyester.

3. The air exhauster of claim 1 wherein said non-woven filter element comprises a non-woven fabric having a basis weight between 50 g/m² and 200 g/m².

4. The air exhauster of claim 3 wherein said non-woven element comprises a non-woven fabric having a basis weight between 70 g/m² and 165 g/m².

5. The air exhauster of claim 1 wherein said covering sheet comprises a non-woven fabric having a basis weight between about 150 g/m² and about 350 g/m².

6. The air exhauster of claim 1 wherein said covering sheet has an average thickness of between about 3 to about 8 mils.

7. The air exhauster of claim 1 wherein including banding along an edge of said filter element wherein said banding comprises a non-woven fabric having a basis weight between about 200 g/m² and about 400 g/m².

8. The air exhauster of claim 1 wherein said covering sheet has a centerline and said filter element includes a filter element centerline and said covering sheet is attached along its centerline to said filter element centerline.

9. The air exhauster of claim 1 wherein said covering sheet includes one or more perforations.

10. The air exhauster of claim 9 wherein said covering sheet includes a plurality of perforations wherein said perforations vary by at least one of a perforation length, spacing, and/or shape.

11. The air exhauster of claim 1 wherein said element and/or said sheet comprises a non-woven fabric comprising one or more of polyester, polyolefin or natural fibers in layered or random orientation.

12. The air exhauster of claim 11 wherein said sheet and/or said element includes activated carbon.

13. The air exhauster of claim 11 wherein said sheet and/or said element includes activated carbon.

14. The air exhauster of claim 1 wherein said non-woven filter element and/or said non-woven comprises one or more of a polyester, a polyolefin or natural fibers in layered or random orientation.

15. An air exhauster for relieving pressure from a vehicle interior comprising:
    a frame and a non-woven filter element contained in said frame wherein said
    non-woven filter element comprises a non-woven fabric having a basis weight of 50 g/m² to 200 g/m² that includes pleats and non-woven banding along an edge thereof having a centerline having a downstream side and an upstream side with respect to air flow;
    a non-woven covering sheet having a centerline attached directly to said centerline of said non-woven pleats on said downstream side, wherein said covering sheet in a first position directly contacts at least a portion of said downstream side of said non-woven pleats to at least partially restrict said element from the inflow of air from said vehicle exterior to said upstream side of said filter and in a second position said portion of said covering sheet is displaced from direct contact with said pleats due to an outflow of air from said vehicle interior and said downstream side of said filter; and
    wherein said covering sheet is directly attached to said pleats of said filter element by one or more of an adhesive, sewing, thermal or energy bonding or hook and loop fasteners.

16. The air exhauster of claim 15 wherein said non-woven filter element comprises a non-woven fabric having a basis weight between 70 g/m² and 165 g/m².

17. The air exhauster of claim 15 wherein said covering sheet comprises a non-woven fabric having a basis weight between about 150 g/m² and about 350 g/m².

18. The air exhauster of claim 15 wherein said covering sheet has an average thickness of between about 3 to about 8 mils.

19. The air exhauster of claim 15 wherein said covering sheet includes one or more perforations.

20. The air exhauster of claim 19 wherein said covering sheet includes a plurality of perforations wherein said perforations vary by at least one of a perforation length, spacing, and/or shape.

21. A method of relieving pressure build-up from the interior of a vehicle, comprising:
    providing a frame and a non-woven filter element contained in said frame wherein the non-woven filter element includes pleats having a downstream side and an upstream side with respect to air flow;
    providing a covering sheet attached directly to at least a portion of said non-woven pleats on said downstream side of said pleats, wherein said covering sheet is attached directly to said pleats by one or more of an adhesive, sewing, thermal or energy bonding or hook and loop fasteners;
    positioning said cover sheet at a first position to directly contact at least a portion of said downstream side of said non-woven pleats to at least partially restrict said element from the inflow of air from said vehicle exterior to said upstream side of said filter;
    positioning said covering sheet at a second position wherein said portion of said covering sheet is displaced from direct contact with said pleats due to an outflow of air from said vehicle interior and said downstream side of said filter.

22. An air exhauster for relieving pressure from a vehicle interior comprising:
    a frame and a non-woven filter element contained in said frame, wherein the
    non-woven filter element includes pleats having a downstream side and an upstream side with respect to air flow;
    a covering sheet including one or more perforations attached directly to at least a portion of said non-woven pleats on said downstream side of said pleats, wherein said covering sheet in a first position directly contacts at least a portion of said downstream side of said non-woven pleats to at least partially restrict said element from the inflow of air from said vehicle exterior to said upstream side of said filter and in a second position said portion of said covering sheet is displaced from direct contact with said pleats due to an outflow of air from said vehicle interior and said downstream side of said filter; and
    wherein said covering sheet is directly attached to said downstream side of said pleats of said filter element by one or more of an adhesive, sewing, thermal or energy bonding, or hook and loop fasteners.

* * * * *